(12) United States Patent
Yun et al.

(10) Patent No.: US 11,414,905 B2
(45) Date of Patent: Aug. 16, 2022

(54) LOCKING STRUCTURE FOR A RECTILINEAR CENTER RAIL FOR OPPOSITE SLIDING DOORS

(71) Applicants: Hyundai Motor Company, Seoul (KR); Kia Motors Corporation, Seoul (KR); Pyeong Hwa Automotive Co., Ltd., Daegu (KR)

(72) Inventors: Hyung-In Yun, Seoul (KR); Byung-Woo Kim, Daegu (KR); Ji-Hak Yoo, Daegu (KR)

(73) Assignees: Hyundai Motor Company, Seoul (KR); Kia Motors Corporation, Seoul (KR); Pyeong Hwa Automotive Co., Ltd., Daegu (KR)

( * ) Notice: Subject to any disclaimer, the term of this patent is extended or adjusted under 35 U.S.C. 154(b) by 402 days.

(21) Appl. No.: 16/801,970

(22) Filed: Feb. 26, 2020

(65) Prior Publication Data

US 2021/0180371 A1  Jun. 17, 2021

(30) Foreign Application Priority Data

Dec. 13, 2019 (KR) .................. 10-2019-0166718

(51) Int. Cl.
*E05B 83/40* (2014.01)
*B60J 5/06* (2006.01)
(Continued)

(52) U.S. Cl.
CPC ............ *E05B 83/40* (2013.01); *B60J 5/0468* (2013.01); *B60J 5/06* (2013.01); *E05B 85/245* (2013.01); *E05C 3/12* (2013.01); *E05Y 2900/531* (2013.01)

(58) Field of Classification Search
CPC .. B60J 5/062; B60J 5/06; B60J 5/0468; E05B 83/40; E05B 85/245; E05Y 2900/531; E05C 3/12
(Continued)

(56) References Cited

U.S. PATENT DOCUMENTS 5,979,971 A * 11/1999 Mizuki .................. B60L 50/66
49/213
8,245,447 B2 * 8/2012 Oh ........................ E05C 17/60
49/164
(Continued)

FOREIGN PATENT DOCUMENTS

KR 100558413 B1 3/2006

*Primary Examiner* — Joseph D. Pape
(74) *Attorney, Agent, or Firm* — Slater Matsil, LLP

(57) ABSTRACT

A locking structure for a rectilinear center rail is provided. The locking structure includes a rectilinear center rail mounted on a sliding door, a center roller unit rollably connected to the center rail, and a center swing arm rotatably connected to the center roller unit and a vehicle body. The center roller unit includes a first lever and a second lever that are configured to rotate about rotation axes formed in a width direction of the center rail. The locking structure is configured to switch between a first posture in which the first lever is configured to be caught by a catching portion formed on the center rail, rotated, and then locked with the second lever and a second posture in which the second lever is configured to be caught by a catching portion formed on the center swing arm, rotated, and then locked with the first lever.

20 Claims, 8 Drawing Sheets

(51) Int. Cl.
*E05B 85/24* (2014.01)
*E05C 3/12* (2006.01)
*B60J 5/04* (2006.01)

(58) Field of Classification Search
USPC .......................................................... 296/155
See application file for complete search history.

(56) References Cited

U.S. PATENT DOCUMENTS

| | | | |
|---|---|---|---|
| 8,276,316 B2* | 10/2012 | Takeda .................. | E05F 15/646 |
| | | | 49/221 |
| 2010/0018125 A1* | 1/2010 | Oh .......................... | E05F 15/40 |
| | | | 49/449 |

* cited by examiner

LOCKING STRUCTURE FOR A RECTILINEAR CENTER RAIL FOR OPPOSITE SLIDING DOORS

CROSS-REFERENCE TO RELATED APPLICATIONS

This application claims priority to Korean Patent Application No. 10-2019-0166718, filed in the Korean Intellectual Property Office on Dec. 13, 2019, which application is hereby incorporated herein by reference.

TECHNICAL FIELD

The present invention relates to a locking structure for a rectilinear center rail for opposite sliding doors.

BACKGROUND

In general, a vehicle has an occupant compartment having a predetermined size in which a driver or a passenger may be seated, and occupant compartment opening/closing doors are installed on a vehicle body to open or close the occupant compartment.

Sliding type occupant compartment opening/closing doors include a front sliding door installed at a front side in a longitudinal direction of a vehicle and a rear sliding door installed at a rear side in the longitudinal direction of the vehicle. The front sliding door and the rear sliding door are typically installed to be moved along rails mounted on a vehicle body or the doors.

Referring to FIGS. 1 and 2, in the case of the sliding type occupant compartment opening/closing door in the related art, a center rail 10 configured to support a middle portion of the door during a process of opening or closing the door is curvedly formed.

In general, a door glass 3 is mounted to be moved upward or downward in a space between a door inner panel 6 and a door outer panel 7 that constitute a door 1. When the curved center rail 10 is mounted on the door 1, one end of the center rail 10 is curved and directed toward the door outer panel 7. In a region (see part X in FIG. 2) where one end of the center rail 10 is curved, the space between the door inner panel 6 and the door outer panel 7 is decreased, and thus the space in which the door glass 3 is mounted is decreased.

That is, in the vehicle mounted with the curved center rail 10, because a flag type outside mirror 4 needs to be applied and division channels 5a and 5b need to be applied to the front door and the rear door, there are problems in that a degree of design freedom is restricted and costs are increased due to the additional application of the above-mentioned components.

As an example of the technology in the related art mounted with the curved center rail, there is Korean Patent No. 10-0558413 (Center Roller Structure for Power Sliding Door).

SUMMARY

The present invention relates to a locking structure for a rectilinear center rail for opposite sliding doors. Particular embodiments include a locking structure for a rectilinear center rail in which levers are locked during an operation of opening or closing the door to prevent the sliding door from deviating in a vehicle in which the rectilinear center rails are mounted on the sliding doors.

Embodiments of the present invention provide a new inventive structure capable of being locked by or unlocked from a rectilinear center rail in a simple configuration in which the rectilinear center rail is applied to a sliding door to improve a degree of design freedom.

An exemplary embodiment of the present invention provides a locking structure for a rectilinear center rail for opposite sliding doors, the locking structure including a rectilinear center rail mounted on the sliding door in a longitudinal direction of the sliding door, a center roller unit rollably connected to the center rail, and a center swing arm rotatably connected to the center roller unit and a vehicle body. The center roller unit includes a first lever and a second lever that rotate about rotation axes formed in a width direction of the center rail. The locking structure may switch between a first posture in which the first lever is caught by a catching portion formed on the center rail, rotated, and then locked with the second lever and a second posture in which the second lever is caught by a catching portion formed on the center swing arm, rotated, and then locked with the first lever, and in which in the second posture, the first lever is released from the catching portion formed on the center rail.

According to embodiments of the present invention, since the rectilinear center rail is applied to the sliding door, the degree of design freedom may be improved.

According to embodiments of the present invention, because the locking structure for the rectilinear center rail is made by assembling constituent components thereof, only the broken components may be separated and easily replaced with a new component.

According to embodiments of the present invention, the locking or unlocking operation of the locking structure for the rectilinear center rail may control the movement of the center roller unit.

DETAILED DESCRIPTION OF ILLUSTRATIVE EMBODIMENTS

Hereinafter, exemplary embodiments of a locking structure for a rectilinear center rail for opposite sliding doors according to the present invention will be described in detail with reference to the drawings. Terms or words used herein should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

A locking structure for a rectilinear center rail for opposite sliding doors according to an exemplary embodiment of the present invention is applied to a rectilinear center rail 100 (hereinafter, referred to as a "center rail") mounted in a longitudinal direction of a sliding door 1 (hereinafter, referred to as a "door").

Specifically, the doors 1 include a front door and a rear door, and the locking structure for the rectilinear center rail for the opposite sliding doors according to an exemplary embodiment of the present invention is applied to the center rail 100 of the front door and/or the rear door. The locking structures for the rectilinear center rails for the opposite sliding doors, which are applied to the front door and the rear door, respectively, are identical in configuration and operational principle. In the present specification, for ease of description, an example in which the locking structure for the rectilinear center rail for the opposite sliding doors is applied to any one door 1 of the front door and the rear door will be described.

Figure 1:
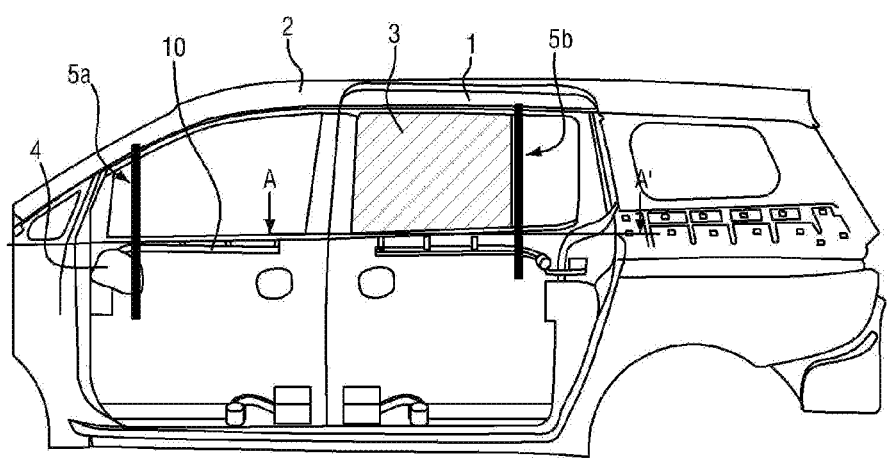
FIG. 1 is a view illustrating a state in which a curved center rail is applied to a sliding door in accordance with a technology in the related art.
Figure 2:
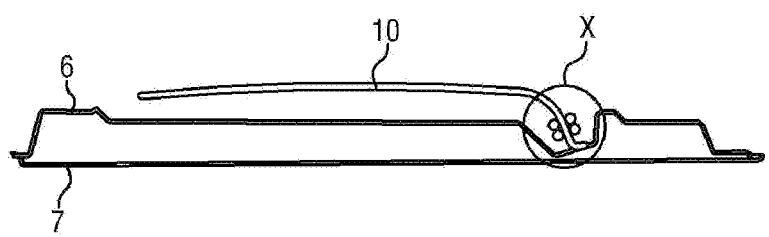
FIG. 2 is a view illustrating a cross section taken along line A-A' in FIG. 1.
Figure 3:
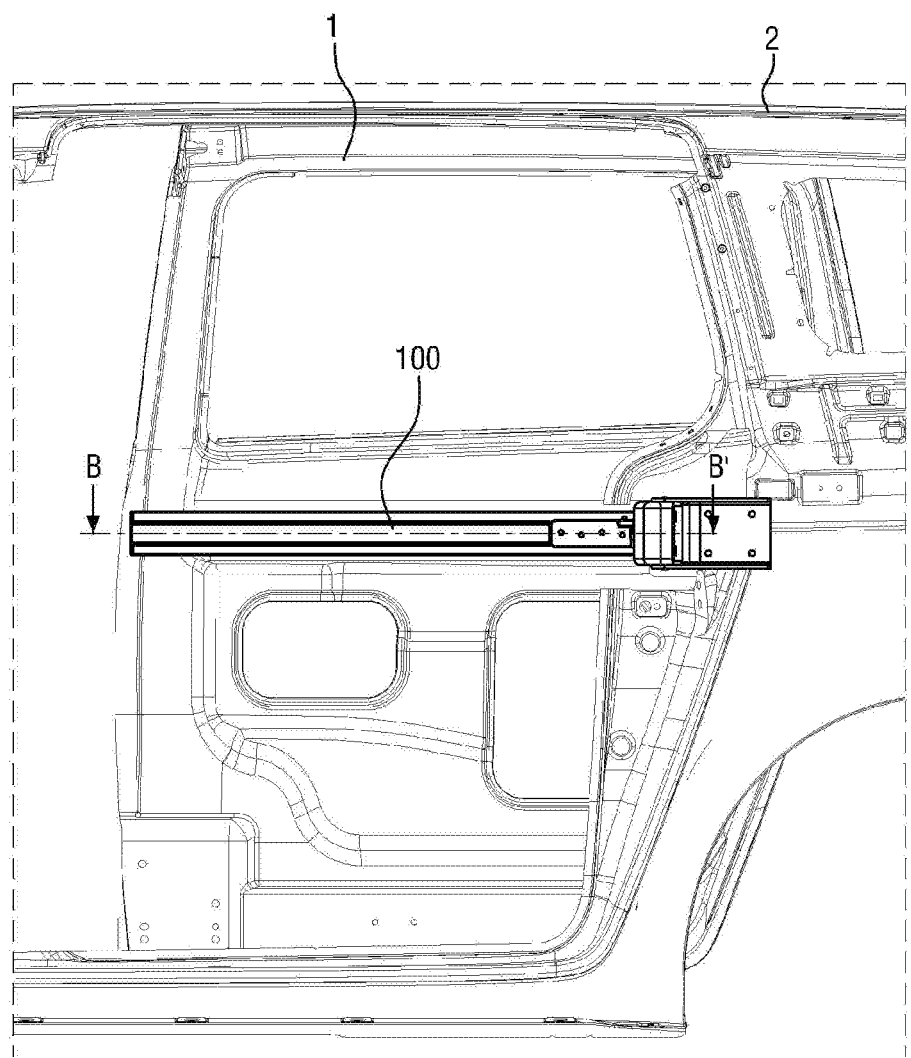
FIG. 3 is a view illustrating a state in which a locking structure for a rectilinear center rail for opposite sliding doors according to an exemplary embodiment of the present invention is applied to the sliding door.
Figure 4:
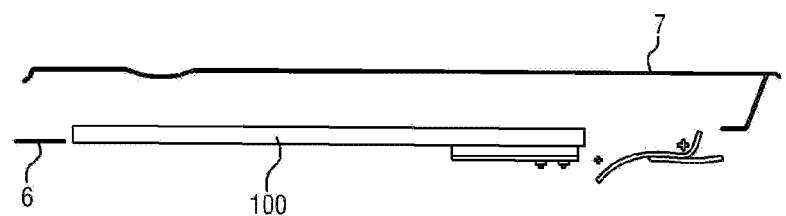
FIG. 4 is a view illustrating a cross section taken along line B-B' in FIG. 3.

FIG. 3 is a view illustrating a state in which a locking structure for a rectilinear center rail for an opposite sliding door according to an exemplary embodiment of the present invention is applied to the sliding door, and FIG. 4 is a view illustrating a cross section taken along line B-B' in FIG. 3.

Referring to FIGS. 3 and 4, the center rail 100 according to an exemplary embodiment of the present invention has a rectilinear shape. That is, unlike the curved center rail 10 mounted on the door 1, the rectilinear center rail 100 is parallel to a door inner panel 6 and a door outer panel 7 of the door 1, and one end of the center rail 100 is not directed toward the inside of the door 1. Therefore, a space between the door inner panel 6 and the door outer panel 7 of the door 1 may be utilized, and a degree of design freedom is higher when the rectilinear center rail 100 is mounted on the door 1 than when the curved center rail 10 is mounted on the door 1.

Figure 5:
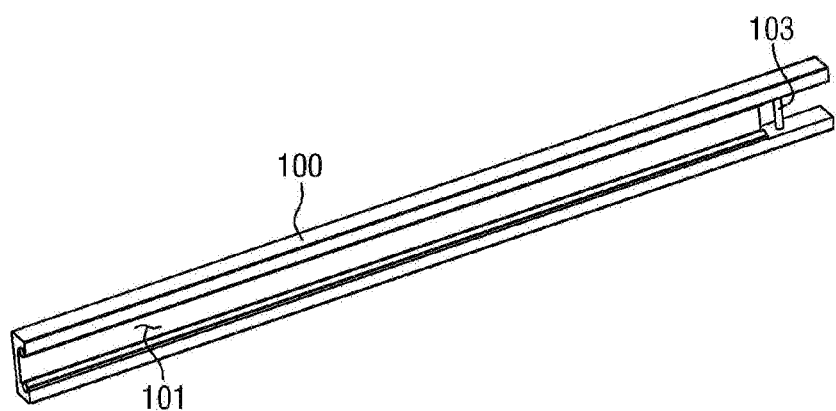
FIG. 5 is a view illustrating the center rail according to an exemplary embodiment of the present invention.

FIG. 5 is a view illustrating a center rail according to an exemplary embodiment of the present invention.

Referring to FIG. 5, the center rail 100 has a center rail groove 101 formed in a longitudinal direction of the center rail 100, and a center roller unit 200 to be described below is rollably coupled to the center rail groove 101, such that the center rail groove 101 serves as a movement route of the center roller unit 200.

The center rail 100 has a center rail striker 103 formed in a width direction of the center rail 100. The center rail striker 103 is formed at one side of the center rail 100. When the door 1 is the rear door, the center rail striker 103 is formed at a right position of the center rail 100 based on FIG. 5.

When the door 1 is the front door, the center rail striker 103 is formed at a left position of the center rail 100 based on FIG. 5.

Figure 6:
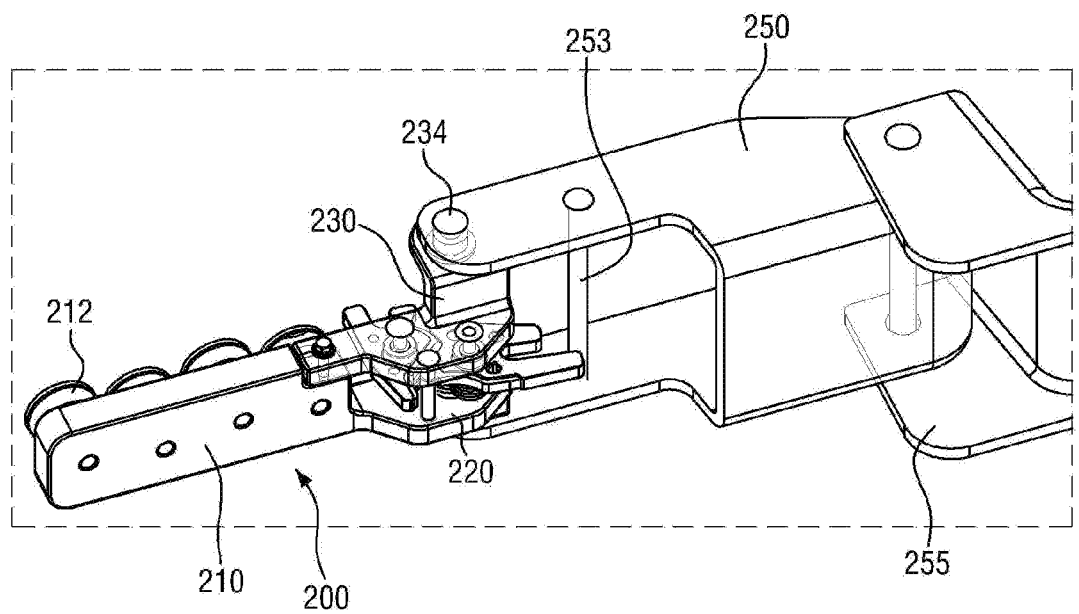
FIG. 6 is a view illustrating the center roller unit according to an exemplary embodiment of the present invention.
Figure 7:
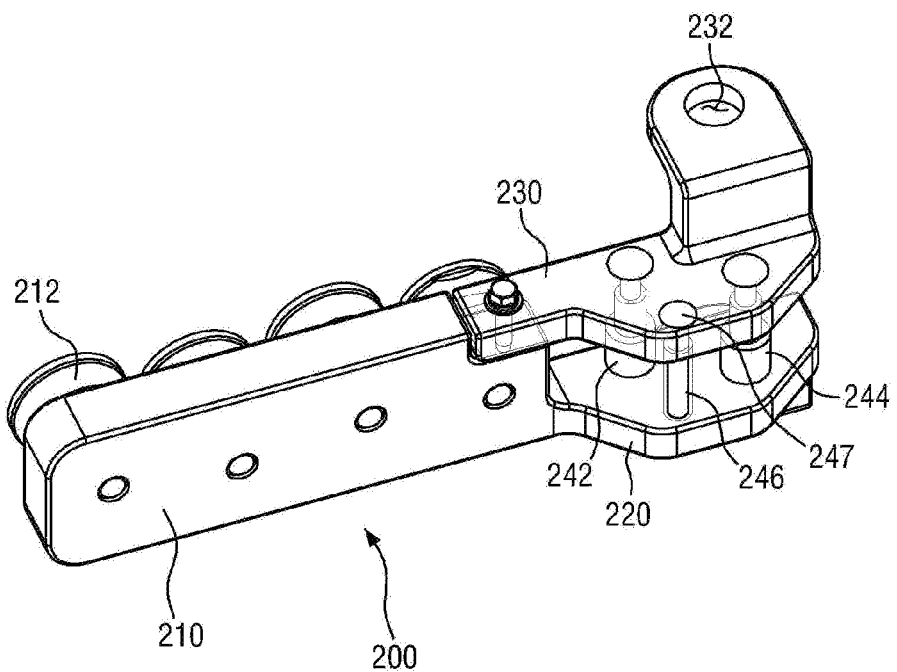
FIG. 7 is a view illustrating a slider in FIG. 6.

FIG. 6 is a view illustrating a center roller unit according to an exemplary embodiment of the present invention, and FIG. 7 is a view illustrating a slider in FIG. 6.

Referring to FIGS. 6 and 7, the center roller unit 200 includes a slider 210, a lower end lever support unit 220, and an upper end lever support unit 230.

A bearing 212 is rotatably connected to the slider 210. The bearing 212 is seated on the center rail groove 101 and may be rotated while being in contact with an inner wall of the center rail groove 101. The slider 210 has the lower end lever support unit 220 configured such that a first lever 260 and a second lever 270, which will be described below, are rotatably connected to the lower end lever support unit 220. One end of a first lever center pin 242, one end of a second lever center pin 244, and one end of a rotation restricting member 246 are rotatably connected to the lower end lever support unit 220. In the exemplary embodiment of the present invention, a rotation restricting center pin 247 is inserted into the rotation restricting member 246. However, only the rotation restricting member 246 may be provided. Meanwhile, a lower end swing arm connecting hole (not illustrated) is formed in the lower end lever support unit 220.

The upper end lever support unit 230 is detachably connected to the slider 210, and the upper end lever support unit 230 is positioned above the lower end lever support unit 220 so as to face the lower end lever support unit 220. The other end of the first lever center pin 242, the other end of the second lever center pin 244, and the other end of the rotation restricting center pin 247 are rotatably connected to the upper end lever support unit 230. Therefore, the first lever center pin 242, the second lever center pin 244, and the rotation restricting center pin 247, which are connected to the upper end lever support unit 230, may rotate with respect to the upper end lever support unit 220 and the lower end lever support unit 230. Meanwhile, an upper end swing arm connecting hole 232 is formed in the upper end lever support unit 230.

The slider 210 is rotatably connected to a center swing arm 250. Specifically, the center swing arm 250 has holes having sizes corresponding to the upper end swing arm connecting hole 232 and the lower end swing arm connecting hole (not illustrated), and a swing arm connecting pin 234 is inserted into the holes in a state in which centers of the holes are aligned with one another, such that the slider 210 and the center swing arm 250 are connected to each other. Meanwhile, the center swing arm 250 is rotatably connected to a swing arm bracket 255 fixedly mounted on a vehicle body 2.

The center swing arm 250 has a center roller striker 253 formed in a width direction of the center rail 100. Therefore, when the center swing arm 250 rotates, the center roller striker 253 also rotates.

Figure 8:
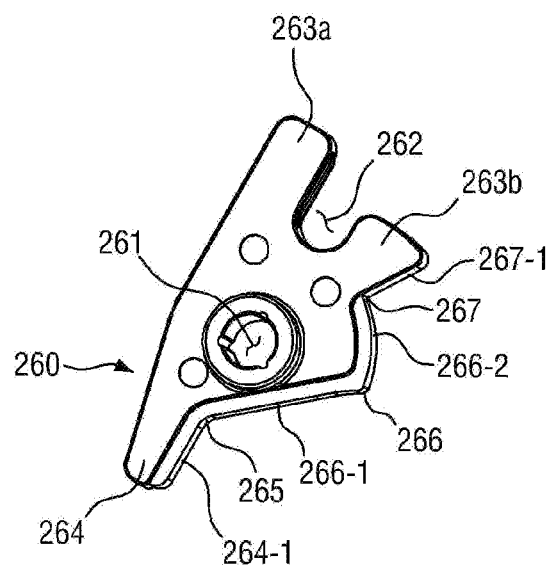
FIG. 8 is a view illustrating a first lever according to an exemplary embodiment of the present invention.
Figure 9:
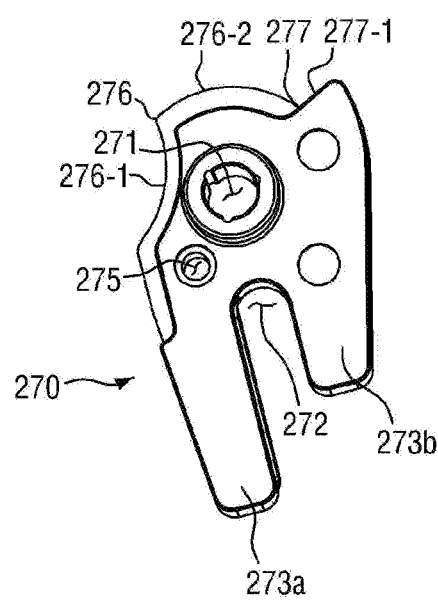
FIG. 9 is a view illustrating a second lever according to an exemplary embodiment of the present invention.

FIG. 8 is a view illustrating a first lever according to an exemplary embodiment of the present invention, and FIG. 9 is a view illustrating a second lever according to an exemplary embodiment of the present invention.

Referring to FIG. 8, the first lever 260 includes a first lever insertion hole 261, a first striker insertion portion 262, a catching portion 264, a first locking portion 266, and a first locking groove 267.

The first lever insertion hole 261 is formed in the first lever 260 so that the first lever center pin 242 may be inserted into the first lever insertion hole 261. In an exemplary embodiment of the present invention, when the first lever center pin 242 is inserted into the first lever insertion hole 261, the first lever 260 is fixed to the first lever center pin 242. Therefore, the first lever 260 may rotate together with the first lever center pin 242. Of course, in another exemplary embodiment of the present invention, the first lever center pin 242 may be fixed, and the first lever 260 may rotate.

The first striker insertion portion 262 is a portion into which the center rail striker 103 is to be inserted. The first striker insertion portion 262 has a groove shape recessed toward the inside of the first lever 260. First insertion guide protrusions 263a and 263b are formed at both sides of the first striker insertion portion 262. Here, one first insertion guide protrusion 263a is longer in length than the other first insertion guide protrusion 263b.

The catching portion 264 has a protruding shape so that the catching portion 264 is caught by the rotation restricting member 246. The catching portion 264 includes a catching surface 264-1. When the first lever 260 rotates and thus the catching surface 264-1 comes into contact with the rotation restricting member 246, the rotation is restricted.

The first locking portion 266 has a shape protruding outward so that the first locking portion 266 is caught by the second lever 270. The first locking portion 266 is defined by a first of first locking forming surface 266-1 and a second of first locking forming surface 266-2 which are approximately inclined. The first of first locking forming surface 266-1 and the catching surface 264-1 are inclined inward and meet together, thereby defining a catching groove 265. According to the exemplary embodiment of the present invention, the second of first locking forming surface 266-2 protrudes outward and has a predetermined curvature.

The first locking groove 267 has a shape recessed inward so that the first locking groove 267 is caught by the second lever 270. The first locking groove 267 is defined by the second of first locking forming surface 266-2 and a third of first locking forming surface 267-1 inclined approximately.

Referring to FIG. 9, the second lever 270 includes a second lever insertion hole 271, a second striker insertion portion 272, a second locking portion 276, and a second locking groove 277.

The second lever insertion hole 271 is formed in the second lever 270 so that the second lever center pin 244 may be inserted into the second lever insertion hole 271. In an exemplary embodiment of the present invention, when the second lever center pin 244 is inserted into the second lever insertion hole 271, the second lever 270 is fixed to the second lever center pin 244. Therefore, the second lever 270 may rotate together with the second lever center pin 244. Of course, in another exemplary embodiment of the present invention, the second lever center pin 244 may be fixed, and the second lever 270 may rotate.

The second striker insertion portion 272 is a portion into which the center roller striker 253 is inserted. The second striker insertion portion 272 has a groove shape recessed toward the inside of the second lever 270. Second insertion guide protrusions 273a and 273b are formed at both sides of the second striker insertion portion 272. Here, one second insertion guide protrusion 273a is longer in length than the other second insertion guide protrusion 273b.

The second locking portion 276 has a shape protruding outward so that the second locking portion 276 is caught by the first lever 260. The second locking portion 276 is defined by a first of second locking forming surface 276-1 and a second of second locking forming surface 276-2 which are approximately inclined. According to the exemplary embodiment of the present invention, the first of second locking forming surface 276-1 is recessed inward and has a predetermined curvature, and the second of second locking forming surface 276-2 protrudes outward and has a predetermined curvature. The second locking portion 276 may be inserted into the first locking groove 267.

The second locking groove 27 has a shape recessed inward so that the second locking groove 27 is caught by the first lever 260. The second locking groove 277 is defined by the second of second locking forming surface 276-2 and a third of second locking forming surface 277-1 inclined approximately. The first locking portion 266 may be inserted into the second locking groove 277.

Meanwhile, a second spring end insertion hole 275 is formed in the second lever 270 according to an exemplary embodiment of the present invention. A function of the second spring end insertion hole 275 will be described below.

Figure 10:
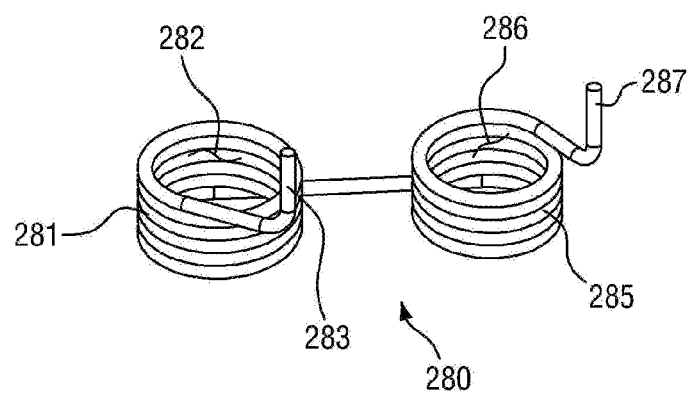
FIG. 10 is a view illustrating a lever spring according to an exemplary embodiment of the present invention.
Figure 11:
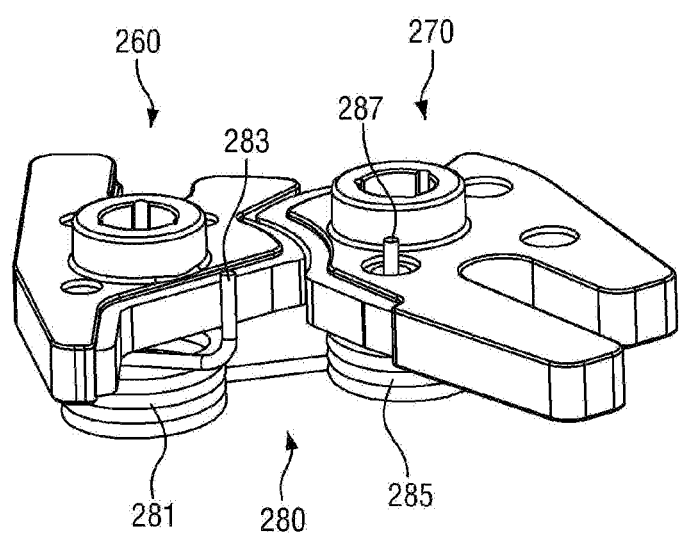
FIG. 11 is a view illustrating a state in which the levers and the lever spring according to an exemplary embodiment of the present invention are coupled.

FIG. 10 is a view illustrating a lever spring according to an exemplary embodiment of the present invention, and FIG. 11 is a view illustrating a state in which the levers and the lever spring according to an exemplary embodiment of the present invention are coupled.

A lever spring 280 is connected to the first lever 260 and the second lever 270, and the lever spring 280 provides elastic force by being rotated. Referring to FIGS. 10 and 11, the lever spring 280 has a shape in which two coil springs, i.e., a first spring 281 and a second spring 285 are connected to each other. The lever spring 280 is positioned below the first lever 260 and the second lever 270.

A first spring insertion hole 282 is formed in the first spring 281 so that the first lever center pin 242 may be inserted into the first spring insertion hole 282. One end of the first spring 281 is connected to the second spring 285, and a first spring end 283 having a bent shape is formed at the other end of the first spring 281.

A second spring insertion hole 286 is formed in the second spring 285 so that the second lever center pin 244 may be inserted into the second spring insertion hole 286. One end of the second spring 285 is connected to the first spring 281, and a second spring end 287 having a bent shape is formed at the other end of the second spring 285.

Meanwhile, the first and second spring ends 283 and 287 illustrated in FIG. 10 are in a state in which no external force is applied, and this state is called a spring equilibrium state.

Referring to FIG. 11, the first spring 281 is positioned below the first lever 260, and the second spring 285 is positioned below the second lever 270. In this state, the first spring end 283 may move along the first of first locking forming surface 266-1 of the first lever 260, and the second spring end 287 is inserted into the second spring end insertion hole 275 of the second lever 270.

Figure 12:
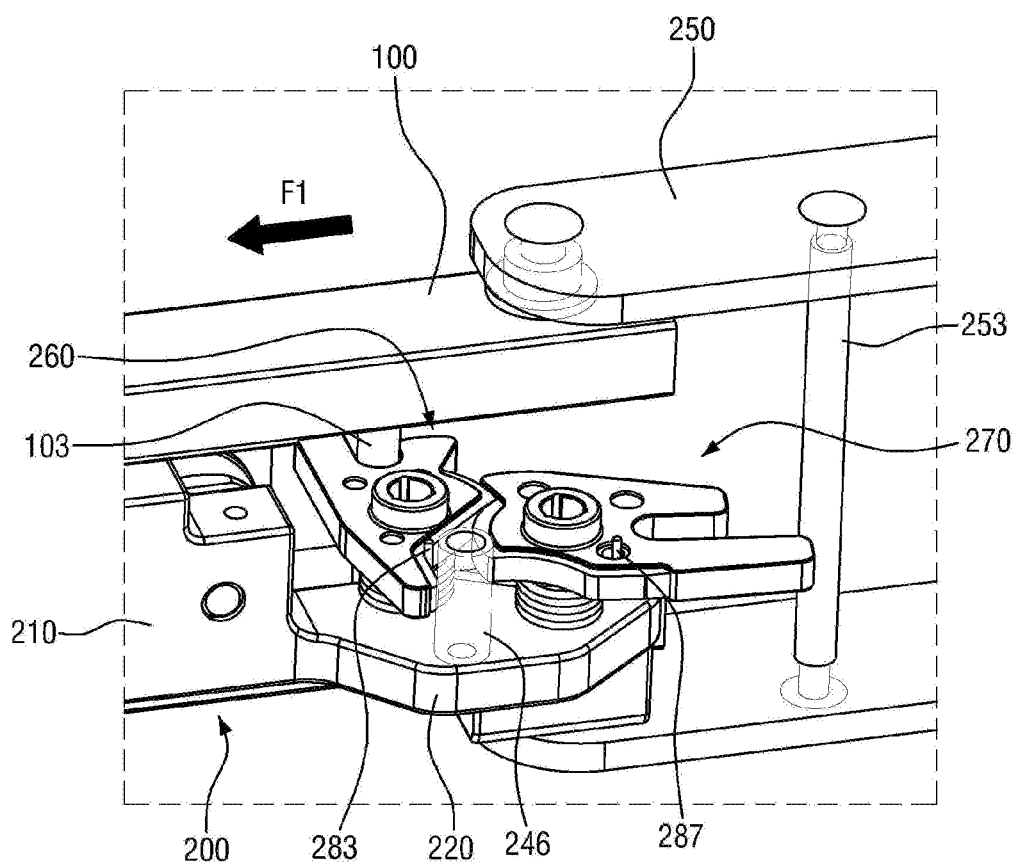
FIG. 12 is a view illustrating a state in which the first lever and the second lever assume a first posture in a state in which the sliding door is closed.
Figure 13:
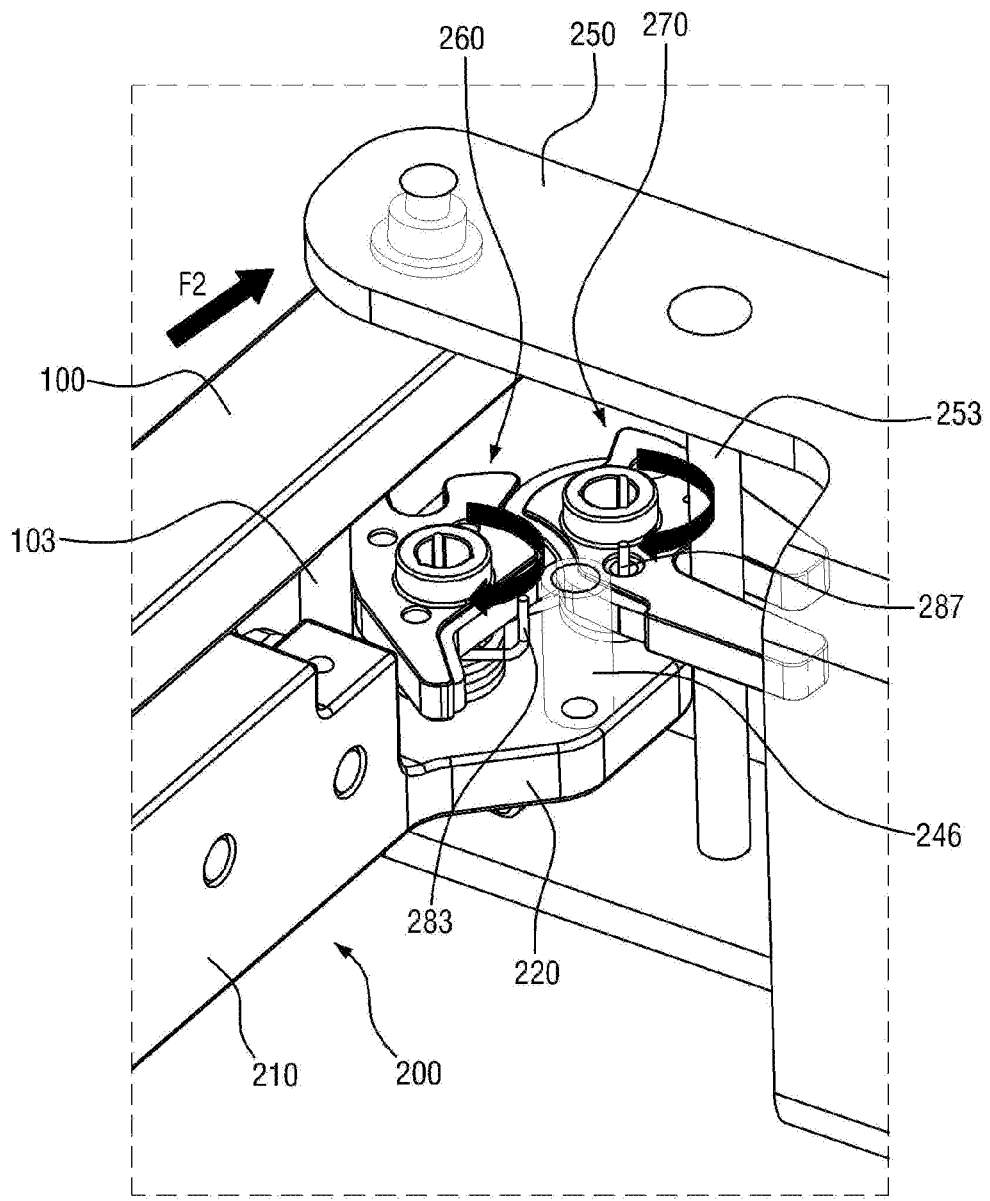
FIG. 13 is a view illustrating a state in which the first lever and the second lever assume a second posture in a state in which the sliding door is opened.

FIG. 12 is a view illustrating a state in which the first lever and the second lever assume a first posture in a state in which the sliding door is closed, and FIG. 13 is a view illustrating a state in which the first lever and the second lever assume a second posture in a state in which the sliding door is opened.

Hereinafter, an operating process of the locking structure for the rectilinear center rail for opposite sliding doors according to an exemplary embodiment of the present invention will be described with reference to FIGS. 12 and 13. In FIGS. 12 and 13, some configurations are omitted for ease of description.

Referring to FIG. 12, when external force is applied in a direction indicated by F1 and the door 1 is closed, the center rail striker 103 is inserted into the first striker insertion portion 262, the first locking portion 266 is inserted into the second locking groove 277 (locked state), and the catching portion 264 is caught by the rotation restricting member 246. Therefore, the door 1 cannot move any further even though external force is further applied to the door 1 in the direction indicated by F1. Here, the first lever 260 assumes a posture approximately perpendicular to the center rail 100, and the second lever 270 assumes a posture approximately parallel to the center rail 100. This posture is called the first posture.

In the first posture, the first spring end 283 is caught by the catching groove 265, and the second spring end 287 is inserted into the second spring end insertion hole 275. Here, while the second spring 285 is in the spring equilibrium state, the first spring 281 is rotated as external force is applied to the first spring end 283 counterclockwise in the spring equilibrium state of the first spring 281. Therefore, elastic restoring force is applied clockwise to the first lever 260 by the first spring 281. However, since the first lever 260 and the second lever 270 are locked by each other, the first lever 260 does not rotate clockwise.

Referring to FIG. 13, when external force is applied in a direction indicated by F2, the center swing arm 250 rotates, and the center roller striker 253 is inserted into the second striker insertion portion 272. Here, since one second insertion guide protrusion 273a is longer in length than the other second insertion guide protrusion 273b, the center roller striker 253 is easily inserted.

The second lever 270 is rotated clockwise by the center roller striker 253. When the second lever 270 rotates, the first locking portion 266 is withdrawn from the second locking groove 267 (unlocked state), and the first lever 260 is rotated clockwise by elastic restoring force of the first spring 281, such that the center rail striker 103 is withdrawn from the first striker insertion portion 262. When the first lever 260 and the second lever 270 continuously rotate and the second of first locking forming surface 266-2 and the first of second locking forming surface 276-1 come into contact with each other, the second locking portion 276 is inserted into the first locking groove 267 (locked state), and the second insertion guide protrusion 273a is caught by the rotation restricting member 246. Therefore, since the slider 210 may move to the left along the center rail 100, the door 1 is opened. Here, the first lever 260 assumes a posture approximately parallel to the center rail 100, and the second lever 270 assumes a posture approximately perpendicular to the center rail 100. This posture is called the second posture.

In this case, the first spring end 283 moves in the catching groove 265 along the first of first locking forming surface 266-1 so that the first spring 281 is in the spring equilibrium state. The second spring 285 is rotated by external force applied clockwise by the center roller striker 253. Therefore, elastic restoring force is applied counterclockwise to the second lever 270 by the second spring 285. However, since the first lever 260 and the second lever 270 are locked by each other, the second lever 270 does not rotate counterclockwise.

Next, a process in which the opened state of the door 1 (the state illustrated in FIG. 13) is changed to the closed state of the door 1 (the state illustrated in FIG. 12) will be described.

When external force is applied in the direction indicated by F1 in the state in which the door 1 is opened, the slider 210 moves to the right, and the center rail striker 103 is inserted into the first striker insertion portion 262. Here, since one first insertion guide protrusion 263a is longer in length than the other first insertion guide protrusion 263b, the center rail striker 103 is easily inserted.

The first lever 260 is rotated counterclockwise by the center rail striker 103. When the first lever 260 rotates, the second locking portion 276 is withdrawn from the first locking groove 267 (unlocked state), and the second lever 270 is rotated counterclockwise by elastic restoring force of the second spring 285, such that the center roller striker 253 may be withdrawn from the second striker insertion portion 272. Further, when the center swing arm 250 further rotates, the center roller striker 253 is completely withdrawn. When the first lever 260 and the second lever 270 continuously rotate and the second of first locking forming surface 266-2 and the third of second locking forming surface 277-1 come into contact with each other, the first locking portion 266 is inserted into the second locking groove 277 (locked state), and the catching portion 264 is caught by the rotation restricting member 246. In this state, the first lever 260 and the second lever 270 assume the first posture, and the door 1 cannot be moved any further even though external force is further applied to the door 1 in the direction indicated by F1.

According to an exemplary embodiment of the present invention, the first and second postures in which the first and second levers 260 and 270 are locked by each other may be maintained even though the external force is applied to the door 1 in the directions indicated by F1 and F2, as a result of which it is possible to prevent the door 1 from deviating during the operation of opening or closing the door 1.

The present invention has been described with reference to the limited exemplary embodiments and the drawings, but the present invention is not limited thereto. The described exemplary embodiments may be variously changed or modified by those skilled in the art to which the present invention pertains within the technical spirit of the present invention and within the scope equivalent to the appended claims.

What is claimed is:

1. A locking structure for a rectilinear center rail for opposite sliding doors, the locking structure comprising:
   a rectilinear center rail mounted on a sliding door in a longitudinal direction of the sliding door;
   a center roller unit rollably connected to the center rail; and
   a center swing arm rotatably connected to the center roller unit and a vehicle body,
   wherein the center roller unit comprises a first lever and a second lever that are configured to rotate about rotation axes formed in a width direction of the center rail,
   wherein the locking structure is configured to switch between a first posture in which the first lever is configured to be caught by a catching portion formed on the center rail, rotated, and then locked with the second lever and a second posture in which the second lever is configured to be caught by a catching portion formed on the center swing arm, rotated, and then locked with the first lever, and
   wherein, in the second posture, the first lever is configured to be released from the catching portion formed on the center rail.

2. The locking structure of claim 1, wherein when in the first posture, the second lever is configured to be caught by the catching portion formed on the center swing arm and rotated, and the second lever and the first lever are configured to be unlocked and to assume the second posture.

3. The locking structure of claim 1, wherein when in the second posture, the first lever is configured to be caught by the catching portion formed on the center rail and rotated, and the first lever and the second lever are configured to be unlocked and to assume the first posture.

4. The locking structure of claim 1, wherein a center rail striker formed in a width direction of the center rail is formed on the center rail so that the first lever is configured to be caught by the center rail striker and rotated, and a center roller striker is formed on the center swing arm so that the second lever is configured to be caught by the center roller striker and rotated.

5. The locking structure of claim 4, wherein the first lever comprises:
a first insertion portion into which the center rail striker is configured to be inserted; and
multiple first insertion guide protrusions formed at both sides of the first insertion portion.

6. The locking structure of claim 5, wherein the second lever comprises:
a second insertion portion into which the center roller striker is configured to be inserted; and
multiple second insertion guide protrusions formed at both sides of the second insertion portion.

7. The locking structure of claim 6, wherein one first insertion guide protrusion, which is formed at a first side among the multiple first insertion guide protrusions, is longer than another first insertion guide protrusion formed at a second side, and one second insertion guide protrusion, which is formed at a first side among the multiple second insertion guide protrusions, is longer than another second insertion guide protrusion formed at a second side.

8. The locking structure of claim 1, wherein the first lever comprises:
a first locking portion having a shape protruding outward and configured to be caught by the second lever in the first posture; and
a first locking groove having a shape recessed inward and configured to be caught by the second lever in the second posture.

9. The locking structure of claim 8, wherein the second lever comprises:
a second locking portion having a shape protruding outward and configured to be inserted into the first locking groove; and
a second locking groove having a shape recessed inward and configured to receive the first locking portion.

10. The locking structure of claim 1, wherein the center roller unit has a rotation restricting member configured to restrict a rotation of the first lever, and the first lever has a catching portion configured to be caught by the rotation restricting member in accordance with a rotation state.

11. A vehicle comprising:
a vehicle body; and
a sliding door, wherein the sliding door comprises a locking structure comprising:
a rectilinear center rail mounted on the sliding door in a longitudinal direction of the sliding door;
a center roller unit rollably connected to the center rail; and
a center swing arm rotatably connected to the center roller unit and the vehicle body,
wherein the center roller unit comprises a first lever and a second lever that are configured to rotate about rotation axes formed in a width direction of the center rail,
wherein the locking structure is configured to switch between a first posture in which the first lever is configured to be caught by a catching portion formed on the center rail, rotated, and then locked with the second lever and a second posture in which the second lever is configured to be caught by a catching portion formed on the center swing arm, rotated, and then locked with the first lever, and
wherein, in the second posture, the first lever is configured to be released from the catching portion formed on the center rail.

12. The vehicle of claim 11, wherein when in the first posture, the second lever is configured to be caught by the catching portion formed on the center swing arm and rotated, and the second lever and the first lever are configured to be unlocked and to assume the second posture.

13. The vehicle of claim 11, wherein when in the second posture, the first lever is configured to be caught by the catching portion formed on the center rail and rotated, and the first lever and the second lever are configured to be unlocked and to assume the first posture.

14. The vehicle of claim 11, further comprising:
a center rail striker formed on the center rail in a width direction of the center rail, wherein the first lever is configured to be caught by the center rail striker and rotated; and
a center roller striker formed on the center swing arm, wherein the second lever is configured to be caught by the center roller striker and rotated.

15. The vehicle of claim 14, wherein the first lever comprises:
a first insertion portion into which the center rail striker is configured to be inserted; and
multiple first insertion guide protrusions formed at both sides of the first insertion portion.

16. The vehicle of claim 15, wherein the second lever comprises:
a second insertion portion into which the center roller striker is configured to be inserted; and
multiple second insertion guide protrusions formed at both sides of the second insertion portion.

17. The vehicle of claim 16, wherein:
one of the first insertion guide protrusions located at a first side of the first insertion portion is longer than another of the first insertion guide protrusions located at a second side of the first insertion portion; and
one of the second insertion guide protrusions located at a first side of the second insertion portion is longer than another of the second insertion guide protrusions located at a second side of the second insertion portion.

18. The vehicle of claim 11, wherein the first lever comprises:
a first locking portion having a shape protruding outward, wherein the first locking portion is configured to be caught by the second lever in the first posture; and
a first locking groove having a shape recessed inward, wherein the first locking groove is configured to be caught by the second lever in the second posture.

19. The vehicle of claim 18, wherein the second lever comprises:
a second locking portion having a shape protruding outward, wherein the second locking portion is configured to be inserted into the first locking groove; and
a second locking groove having a shape recessed inward, wherein the first locking portion is configured to be inserted into the second locking groove.

20. The vehicle of claim 11, wherein the center roller unit has a rotation restricting member configured to restrict a rotation of the first lever, and the first lever has a catching portion configured to be caught by the rotation restricting member in accordance with a rotation state.

* * * * *